US012390942B2

(12) United States Patent
Biondi et al.

(10) Patent No.: US 12,390,942 B2
(45) Date of Patent: Aug. 19, 2025

(54) UNIT AND METHOD FOR RETAINING AND MOVING AT LEAST ONE COMPONENT AND AT LEAST ONE CONTAINER AND PRODUCTION APPARATUS FOR ARTICLES CORRELATED THERETO

(71) Applicant: G.D S.P.A., Bologna (IT)

(72) Inventors: Andrea Biondi, Bologna (IT); Luca Cavazza, Bologna (IT); Umberto Zanetti, Bologna (IT); Enrico Campagnoli, Bologna (IT); Antonio Gigante, Bologna (IT); Giacomo Noferini, Bologna (IT); Cristian Dakessian, Bologna (IT)

(73) Assignee: G.D S.P.A., Bologna (IT)

( * ) Notice: Subject to any disclaimer, the term of this patent is extended or adjusted under 35 U.S.C. 154(b) by 292 days.

(21) Appl. No.: 17/998,487

(22) PCT Filed: Jul. 26, 2021

(86) PCT No.: PCT/IB2021/056712
§ 371 (c)(1),
(2) Date: Nov. 10, 2022

(87) PCT Pub. No.: WO2022/023927
PCT Pub. Date: Feb. 3, 2022

(65) Prior Publication Data
US 2023/0173686 A1 Jun. 8, 2023

(30) Foreign Application Priority Data

Jul. 31, 2020 (IT) .................. 102020000018799

(51) Int. Cl.
*B25J 15/00* (2006.01)
*B25J 15/06* (2006.01)
(Continued)

(52) U.S. Cl.
CPC ....... *B25J 15/0052* (2013.01); *B25J 15/0616* (2013.01); *B65G 47/847* (2013.01); *B65G 47/848* (2013.01); *B65G 47/918* (2013.01)

(58) Field of Classification Search
CPC ....... B65B 29/022; B65B 43/50; B65B 43/46; B65B 35/38; B65B 35/36; B65B 35/26;
(Continued)

(56) References Cited

U.S. PATENT DOCUMENTS 5,683,729 A * 11/1997 Valles ............... B29C 49/42122
425/534
2002/0093126 A1 * 7/2002 Choinski ........... B29C 49/42122
425/534
(Continued)

FOREIGN PATENT DOCUMENTS

CN 109625957 A * 4/2019 ........... B65G 47/917
EP 2415538 A1 * 2/2012 ............ B21D 43/14
(Continued)

OTHER PUBLICATIONS

International Search Report and Written Opinion for International Application No. PCT/IB/2021/056712 filed on Jul. 26, 2021 on behalf of G.D S.P.A. Mail Date: Oct. 21, 2021, 16 pages.

*Primary Examiner* — Gene O Crawford
*Assistant Examiner* — Muhammad Awais
(74) *Attorney, Agent, or Firm* — Steinfl + Bruno LLP

(57) ABSTRACT

A retention and movement unit of at least one component and at least one container is described. The unit has a moving retention member including, in turn, a frame and a first gripping device with a first retention element, the gripping device having a first configuration for selectively retaining the at least one component by the first retention element. In a first alternative, the first gripping device has a second configuration, different from the first configuration, for selectively retaining the at least one container. In the (Continued)

second alternative, the moving retention member further includes a second gripping device, including a second retention element, the second gripping device having a second configuration, different from the first configuration, for selectively retaining said at least one container.

19 Claims, 4 Drawing Sheets

(51) Int. Cl.
  *B65G 47/84* (2006.01)
  *B65G 47/86* (2006.01)
  *B65G 47/91* (2006.01)
(58) Field of Classification Search
  CPC ......... B65B 35/18; B65B 35/16; B65D 41/00; B67B 3/2033; B25J 15/0616; B25J 15/02; B25J 15/0052; B65G 17/323; B65G 47/91; B65G 47/847; B65G 47/848; B65G 47/918; B65G 29/00; B65G 2201/0244; B65G 2201/0252; B65G 2201/0255
  USPC ................ 198/803.5, 480.1, 441, 459.2, 619
  See application file for complete search history.

(56) References Cited

U.S. PATENT DOCUMENTS

| | | | | |
|---|---|---|---|---|
| 2011/0056809 | A1* | 3/2011 | Borgatti | ............ B29C 49/42069 |
| | | | | 198/803.3 |
| 2011/0142981 | A1* | 6/2011 | Borgatti | ................ B65G 29/00 |
| | | | | 425/540 |
| 2013/0126306 | A1* | 5/2013 | Rack | ....................... B65B 5/068 |
| | | | | 198/689.1 |
| 2016/0009427 | A1* | 1/2016 | Rea | ......................... B65B 35/18 |
| | | | | 53/282 |
| 2016/0355286 | A1* | 12/2016 | Cavazza | ............... B29C 66/849 |
| 2019/0077529 | A1* | 3/2019 | Baraccani | .............. B65B 35/16 |
| 2019/0161289 | A1* | 5/2019 | Hashimoto | ............. B25J 13/00 |

FOREIGN PATENT DOCUMENTS

| | | | | |
|---|---|---|---|---|
| EP | | 3466847 A1 | 4/2019 | |
| JP | | H07 97044 A | 4/1995 | |
| WO | | 2009/144664 A2 | 12/2009 | |
| WO | | 2017/163166 A1 | 9/2017 | |
| WO | WO-2019159117 A1 * | 8/2019 | ............... B65C 9/04 |

* cited by examiner

UNIT AND METHOD FOR RETAINING AND MOVING AT LEAST ONE COMPONENT AND AT LEAST ONE CONTAINER AND PRODUCTION APPARATUS FOR ARTICLES CORRELATED THERETO

CROSS REFERENCE TO RELATED APPLICATIONS

The present application is the U.S. National Stage Entry of International Patent Application No. PCT/IB2021/056712, filed on Jul. 26, 2021, which in turn, claims priority to Italian Application No. IT 102020000018799, filed on Jul. 31, 2020.

The present invention relates to a unit and method for retaining and moving at least one component and at least one container, and to a production apparatus for articles correlated thereto.

In particular, the container under consideration is also configured to be used as a loose article.

The present invention finds a preferred, although not exclusive, application in the sector of realising containers for loose articles such as capsules of infusion type products, for example coffee, a sector to which reference can be made hereinafter without losing generality.

A retention and movement unit of an element generally comprises a retention device and a movement device which is suitable for carrying out desired movements of the object of interest within a given processing chain.

Typically, the containers pertaining to this technical field are products having a capsule shape (i.e. substantially truncated conical upturned with the widest portion upwards) and made of semi-finished polymeric materials.

Generally, the step of moving the capsule is carried out by means of a device that moves integrally with a transporter so as to intermittently reach different stations.

Typically, the various single discrete process steps envisaged are carried out in single stations in which the capsule is brought by the transporter.

In this context, a process is said "continuous" when at each time coordinate the transporter that moves the container has a speed other than zero. This considered speed is the speed of the transporter during any processing step that leads to the coupling of the component with the container with respect to a fixed reference system and is intended as the speed of the transporter in its entirety.

In this context, the term "container" identifies a structure which is formed so to be able to contain material within it and in particular to be able to confine it at least laterally. In this sense, the material is considered to be "laterally confined" when the shape of the container is such as to retain the material within it even when the container, in its normal condition of use by a user, is inclined with respect to the support plane by a predetermined angle.

This container can be formed by one or more walls according to the content thereof or to specific aesthetic or functional reasons. For example, the container may be a box-shaped body capable of receiving powder, liquid, gel or similar products inside.

According to another example, the container may be cup-shaped or hemispherical and thus composed by only a curved wall. In this case, this curved wall comprises a central base portion which can preferably act as a support surface and a lateral crown which extends radially from the aforesaid base portion and is shaped so as to confine the product inside the container during the envisaged filling or use operations.

In this context the term "container" can be correlated with the term "capsule" of which it is considered to be a broader and more general formulation.

In this context, a first element is defined as "engaged" with a second element when an interaction is established between the two elements such that the first element is able to determine the positioning of the second element. This interaction may be, for example, of a mechanical, magnetic or other nature.

An orientation is said "horizontal" when it is parallel to the ground plane in which the unit object of the invention is installed.

Consistently, the term "vertical" identifies a direction perpendicular to the horizontal plane and so must be understood the terms relating to "higher, lower, upward or downward" positionings or movements that refer to an orientation along the vertical direction.

In this context, the term "selectively" indicates a method for using a device or similar technical element that allows to freely activate or deactivate it according to preference and also, in case of a plurality of usable devices being present, to select which ones to activate simultaneously.

In this context, the term "stable" indicates an engagement of an object with respect to a constraint element for which this object does not change its spatial position while it is retained in this way.

In this context, the term "constrained" refers to a stable engagement between two parts which may still allow for specific movements. In other words, the term constrained defines a set of constraint conditions which comprises, for example, constraint with permitted movement, constraint with permitted rotation, constraint with permitted translation, constraint with permitted rotation-translation, etc.

In this context, the term "rotation" means the set of symmetry operations that comprise at least one rotation, i.e. a variation of two out of three vectors of a spatial triad.

In this sense, therefore, the term "rotation" includes pure rotations of rigid bodies, the rotations-translations and the rotations of a more complex type.

Consistent with this, the term "curved trajectory" does not only indicate a purely rotational trajectory, but a curved line that can result from complex symmetry operations involving at least one rotation and realised by, for example, cam mechanisms, linkages, hinges, etc.

In this context, the term "superimposed" indicates a condition whereby a projection on a reference plane of a first element is found to occupy at least partially the same area as a projection on the same reference plane of a second element.

In this context, the term "configuration" refers to a spatial arrangement of a device or parts thereof which is suitable to enable a predetermined operation to be carried out.

In this sense, for example, a configuration may relate to a movement of moving parts in order to activate or deactivate a specific engagement, or it may be a movement of an entire device at a predetermined operational position, or it may be a complex combination of several operations such as those described above.

The term "eccentric" identifies a rotating element having a main axis of development and whose rotation trajectory is realised around a rotation axis that does not coincide with the aforesaid main axis.

"Transfer zone" means a portion of a closed transport path of gripping devices which interact with each other and are suitable for carrying out a transfer of an article from a first device to a second one. This article may then be transferred again by the second device to the first device, which may carry out new operations on the same article.

"Reception zone" means a portion of a closed transport path of gripping devices which interact with each other and are suitable for carrying out a transfer of an article from a first device to a second one.

"Release zone" means a portion of a closed transport path of gripping devices and seats which interact with each other and are suitable for carrying out a release of an article from a first device to a second device without that article being able to be processed again by the first device.

The terms "same time span" means the same time interval considered. This interval can be, for example, equal to 10 seconds. In this sense, actions that occur in the same time span do not necessarily take place simultaneously but begin and end within the same time interval.

In this context, the term "pincer" means a retention or grasping device which comprises at least one movable claw. In fact, in order to create a stable constraint by means of a pincer, it is not strictly necessary to have two mutually hinged rotating claws or arms, but it may be sufficient to have a fixed abutment element and a claw with an ability to rotate and/or move in translation to and from said abutment element.

The Applicant has noted that, in packaging processes, the speed of transfer of the articles is crucial to the overall economics of the process, as high production volumes can be achieved with fewer packaging apparatuses.

Furthermore, the Applicant has observed that, in addition to the need to proceed as quickly as possible, another important and unavoidable requirement is represented by the fragility of the article being transferred, which may have to be discarded if it is damaged, or if the content thereof is inadvertently altered or compromised even in minimal parts.

Furthermore, nor can the need for flexibility be neglected, which requires that in the packaging apparatus the transfer of articles of different shapes, or of shapes that have irregularities, such as a diameter that varies with the height of the article, is ensured.

These needs are particularly felt at high transfer speeds, when a precise and correct movement of the articles in the target positions represent a critical factor for the economy of the production process.

Furthermore, this need is reinforced when, in a packaging machine, an increase in the process speed is required and which must be managed without any inconvenience or error.

In addition, the apparatus must also be able to manage articles of different format, without requiring adaptive interventions in the packaging apparatus each time.

Even more, the Applicant has noted that the techniques used generally provide for a moving member to move the products to be processed to different processing stations placed according to a specific operating sequence.

However, this approach is very fragmented and does not allow for an optimal reduction of the overall process time employed, nor does it allow for an effective saving of steric space by all the single stations required.

The Applicant has also verified that the continuous transfer of the articles allows obtaining, in a packaging apparatus, high overall productivity rates, thus entailing an increase in the yield per unit of time.

The Applicant has understood that this need to reduce processing times, reduce dimensions and optimise the process flow occurs both in the continuous transfer but also in the step advancement, and above all in the transfer at high speeds for which this problem requires the adoption of appropriate measures to obtain an adequate treatment of the articles.

The Applicant has therefore realized that the adoption of particular technical characteristics, useful for treating the articles without damaging them, can possibly be exploited to grasp through at least one device more than one article to be subjected to different processes that take place simultaneously or in a complementary manner to other operations in the same time span.

The Applicant has therefore perceived that an effective adaptability and capacity for the simultaneous movement of a plurality of articles could significantly increase the process yield, in particular for products subjected to similar or inter-correlated processes.

Finally, the Applicant has found that by suitably modifying a gripping device so as to allow it to process more than one type of article in the same time span, it is possible to obtain both a reduction in the necessary processing times and an increase in the required adaptability.

In particular, in a first aspect thereof, the invention relates to a retention and movement unit of at least one component and at least one container comprising a moving retention member.

Preferably, said moving retention member comprises a frame.

Preferably, said moving retention member comprises a first gripping device which is secured to said frame.

Preferably, said first gripping device comprises a first retention element.

Preferably, said first gripping device is configured so as to be able to take up a first configuration which is suitable for selectively retaining said at least one component by means of said first retention element.

Preferably, said first gripping device is configured so as to be able to take up a second configuration, which is different from said first configuration and which is suitable for selectively retaining said at least one container.

Alternatively, said first gripping device is secured to said frame.

Preferably, said first gripping device comprises said first retention element which is configured so as to be able to take up said first configuration.

Preferably, said moving retention member comprises a second gripping device which is secured to said frame.

Preferably, said second gripping device comprises a second retention element which is configured so as to be able to take up said second configuration.

Preferably, said first configuration is suitable for selectively retaining said at least one component by said first retaining element.

Preferably, said second configuration is different from said first configuration and is suitable for selectively retaining said at least one container.

Thanks to this technical solution, the Applicant has found that it can retain and move both a component and a container in the same time span in a precise, effective, controlled and well reproducible manner.

In fact, thanks to this solution, it is possible to manage and move two separate products with a single moving member.

These distinct products can also be the same type of product in two different process steps.

Even more, thanks to this technical solution the Applicant is able to optimise the functional movements and transfers of several types of products by means of a single moving member, thus increasing the production yield of the process in question.

In a second aspect thereof, the invention relates to an article production apparatus comprising said retention and movement unit having the features described above.

Preferably, said article production apparatus comprises a second unit which operatively interacts with said retention and movement unit.

Preferably, said second unit is configured to receive from said retention and movement unit, at a predetermined transfer zone of said retention and movement unit, at least one component.

Preferably, said second unit is configured to give, at a predetermined reception zone of said retention and movement unit, at least one container to said retention and movement unit.

In this way it is possible to carry out a double exchange in the same time span or simultaneously between the retention and movement unit and the second unit in order to further reduce and optimise the processing times.

In a third aspect thereof, the invention relates to a method for retaining and moving a component and a container comprising providing a retention and movement unit.

Preferably, said retention and movement unit comprises a moving retention member.

Preferably, said moving retention member comprises a first gripping device which is configured so as to be able to take up a first configuration for said at least one component.

Preferably, said first gripping device is configured so as to able to take up a second configuration, which is different from said first configuration, for said at least one container.

Alternatively, said moving retention member comprises said first gripping device comprising said first retention element which is configured so as to be able to take up said first configuration for said at least one component.

Preferably, said moving retention member comprises a second retention device which comprises a second retention element.

Preferably, said second retention element is configured so as to be able to take up said second configuration, which is different from said first configuration, for said at least one container.

Preferably, said retention and movement unit comprises a transporter wherein there can be defined a transfer zone, a reception zone, and a release zone.

Preferably said transporter is configured to move said retention and movement unit along a closed loop processing trajectory.

Preferably, said method comprises picking up said at least one component by means of said first gripping device according to said first configuration.

Preferably, said method comprises moving said retention and movement unit by means of said transporter so as to move said first gripping device in the region of said transfer zone.

Preferably, said method comprises transferring to a second unit which operatively interacts with said retention and movement unit said at least one component by means of said first gripping device according to said first configuration.

Preferably, said method comprises moving said retention and movement unit by means of said transporter so as to move said first or second gripping device at said reception zone.

Preferably, said method comprises receiving said at least one container in said first gripping device or second gripping device by means of said second configuration.

Preferably, said method comprises moving said retention and movement unit by said transporter so as to move said first gripping device or second gripping device at said release zone.

Preferably, said method comprises releasing by means of said first gripping device or second gripping device said container at a third unit, which operatively interacts with said retention and movement unit at said release zone.

In this way, it is possible to carry out several operations in the same time span using the same retention and movement unit, thus resulting in a reduction in the total processing times and an increase in productivity.

Furthermore, this solution also allows to reduce the overall dimensions of the units necessary to carry out the desired working process.

Preferably, said method comprises moving said retention and movement unit along a closed loop processing trajectory.

Preferably said transfer zone, said reception zone and said release zone are defined on said closed loop processing trajectory.

In at least one of the above-mentioned aspects, the present invention may also have at least one of the preferred features described below.

Preferably, said first retention element and/or said second retention element operate(s) at reduced pressure.

In this way it is possible to realise effective stable and selectively activatable constraints of the desired products.

Preferably, said first retention element operates at reduced pressure and said second retention element is a selectively operable pincer.

In this way it is possible to secure and process different types of products that are also intended for different process steps in one single moving member.

For example, the elements under reduced pressure are particularly practical in retaining and moving products with flat surfaces, while pincers are particularly effective in retaining and moving products with conical or upturned conical-prismatic developments.

Preferably, said pincer comprises at least one movable claw which is suitable for being reversibly moved between a gripping configuration, in which it is at a minimum spacing from a further abutment element, and a release configuration, in which it is at a maximum spacing from said further abutment element.

Thanks to these features, it is possible to create a retention and movement unit in which the articles being moved do not run the risk of receiving any form of damage during the gripping by the pincer, regardless of the shape of the article and the actual relative position in which it is grasped.

In addition, thanks to their different operating characteristics, the first and second retention elements can be arranged on different and very close levels, allowing compact configurations to be created with reduced dimensions for the same number of articles transported.

Even further, the pincer allows easy adaptation to the shape and size of the article being transported, reducing the risk of damage.

This further abutment element can be, for example, a fixed plate-like structure which acts as an abutment for the movable claw.

Preferably, said movable claw is moved by means of rotation around a second horizontal rotation axis.

In this way, the adoption in the pincer device of a claw capable of rotating around a horizontal rotation axis (and in this sense parallel to the main longitudinal development of this claw) can make the grasp even more delicate, but also insensitive to the small variations in diameter that could depend on a different gripping height or variation in format.

Preferably, said at least one movable claw has a substantially laminar extent and comprises a gripping edge which faces said further abutment element and which comprises at least one recess which is formed so as to define, in conjunction with said further abutment element, at least one seat for said container.

This further increases the gripping efficiency of the pincer, which provides for securing the intended articles in a predetermined seat.

Preferably, said at least one movable claw comprises a plurality of said claws.

In this way it is possible to retain and move a plurality of articles simultaneously, thus effectively increasing the productivity of the process.

Preferably, said pincer comprises a pair of movable claws cooperating with each other so that each one acts as said further abutment element for the other one, each one being rotatable about an individual second horizontal rotation axis.

The Applicant has noted that such a solution allows a further improvement of the constraint delicacy achieved by further reducing the damages that can be induced on the transported article while maintaining high process speeds.

Preferably, said movable claws are each mounted on respective bases not in the region of said second rotation axis, but instead with a predetermined spacing therefrom in such a manner that, when each movable claw is moved by means of rotation, it carries out a movement along a curved trajectory.

Thanks to this technical solution, each claw arrives at the position corresponding to the gripping configuration according to a curved trajectory and therefore with a direction component that is not purely translational. In this way the approach and the constraint, especially with upturned conical shaped products, take place in an even more delicate way.

Preferably, said second retention element, when it is present, is vertically aligned with said first retention element.

This makes it possible to further compact the retention and movement unit, and also it makes it easier to provide additional devices in other collaborating units that have the same operational pace as the moving retention member.

Preferably, said first gripping device comprises a plurality of said first gripping elements.

In this way it is possible to further increase the productivity of the process.

Preferably, said second gripping device comprises a plurality of said second gripping elements.

In this way it is possible to further increase the productivity of the process.

Preferably, said plurality of first gripping elements are arranged vertically aligned and staggered to each other on different horizontal levels.

This further optimises the overall steric space of the retention and movement unit.

Preferably, said plurality of second gripping elements are arranged horizontally aligned and staggered to each other on different vertical levels.

This further optimises the overall steric space of the retention and movement unit.

Preferably, said retention and movement unit comprises a transporter on which said movement moving member is received.

In this way it is possible to combine a movement step with the retention step described above, making the total process even more industrially advantageous.

Preferably, said transporter is a rotary carousel.

In this way, the transporter used returns to the same reference position after a 360° rotation.

Thanks to this technical solution, it is possible to realize a carousel that removes and moves the desired containers and components quickly and efficiently, minimising the time required by moving along a closed processing trajectory.

The transfer, reception and release zone are defined on the closed loop processing trajectory and are provided on defined positions thereof.

Preferably, said transporter comprises a plurality of moving coupling members.

In this way it is possible to further increase the productivity of the coupling unit.

Preferably, said plurality of equipment items are spaced apart with uniform angular spacing.

Preferably, said plurality of said seats are arranged radially in alignment with said rotary carousel.

In this way, an orderly arrangement is achieved through which exchanges can be made with other collaborating units that also provide for removals and transfers of a plurality of articles in a preferably, but not limitedly, radial alignment.

Preferably, said first retention element and second retention element move with a continuous movement.

Preferably, said transporter moves at a constant speed.

The Applicant has found that thanks to this technical solution it is possible to carry out the desired working process in a continuous manner, i.e. by keeping the system always in motion so that the operations produced by the moving member are carried out while it moves uniformly in the space according to its constraint with the transporter.

In fact, in this way it is possible to activate the related kinematic mechanisms with lower accelerations and decelerations than to what is necessary in the state of the art since all the devices envisaged by the process are comprised in the moving member and move consistently therewith.

This technical solution means that the sum of the times of the single steps of the movement and coupling process is shorter than those obtainable with the intermittently operating known technique, producing also an increase in the average life of the mechanical parts used, since they are not subject to sudden accelerations and decelerations.

It is in fact important to note that the approach adopted in this case by the Applicant appears to be opposite to the one that envisages that the moving member in different configurations must always collaborate with fixed external stations through intermittent processes. This operating condition arises from the fact that the Applicant has carried out targeted and in-depth studies aimed at verifying that a moving retention member according to the present invention that moves in space if it does so with constant speeds, and therefore does not undergo significant accelerations or decelerations, is capable of operating correctly and in a reproducible manner.

Preferably, said transfer zone and said reception zone substantially coincide.

In this way it is possible to have two different operations taking place simultaneously or in the same time span, minimising the space requirements and optimising the total process times.

Preferably, said apparatus comprises a third unit which is operatively connected to an outlet transfer line comprised in said retention and movement unit, and said third unit being connected downstream of said reception zone according to said direction of movement of said retention and movement unit.

In this way it is possible to exchange the product received from the second unit to a third unit, further increasing the productivity of the process.

Preferably, said release zone is located at a rotation of about 120° from the reception zone.

Preferably, said third unit comprises a belt or a rotary carousel.

In this way it is possible to maintain a process with a continuous movement and the same pace as in the retention and movement unit.

Preferably, said method comprises the fact that said transporter is a rotary carousel and the intended movements are realised by means of rotation of said rotary carousel about a rotation axis.

Preferably, said method comprises the fact that said transfer of said at least one component and said reception of said at least one container are carried out substantially simultaneously.

In this sense, preferably, said transfer zone and said reception zone are at least partially superimposable.

Thanks to this technical solution it is possible to further reduce the total process times and the required overall dimensions.

Preferably, said method comprises the fact that said transfer to said third unit takes place by means of an outlet transfer line which is positioned downstream with respect to said transfer zone according to a direction of movement of said transporter of said retention and movement unit.

The characteristics and advantages of the invention will become clearer from the detailed description of an embodiment shown, by way of non-limiting example, with reference to the appended drawings wherein.

Figure 4:
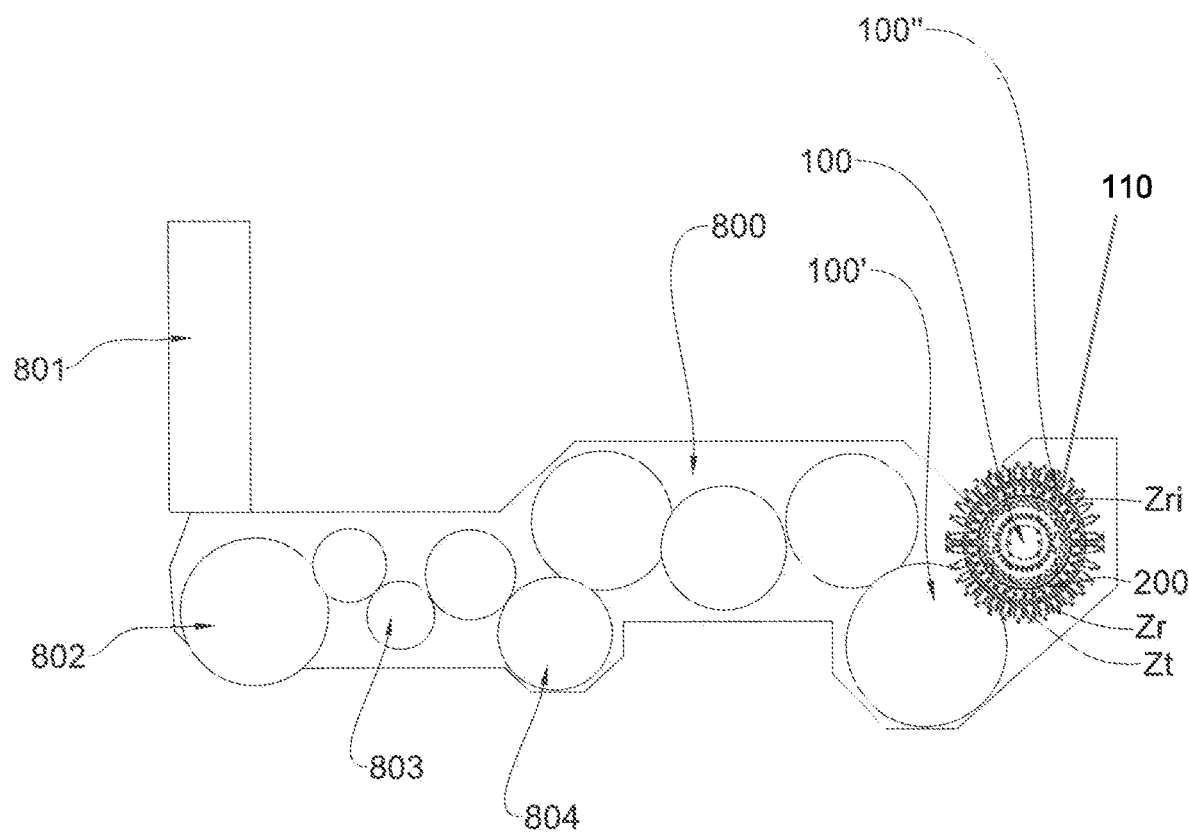
FIG. 4 represents a schematic view from above of an article production apparatus according to the present invention.

With initial reference to FIG. 4, 800 denotes an article production apparatus which is provided to produce a finished container 10, ready for packaging or use.

The apparatus 800 preferably comprises a feeding station 801, a shaping station 802 of a filter, a sealing station 803 of the filter to the container 10, a filling station 804 of the container 10.

The example embodiment described below takes under consideration containers 10 in the form of capsules which are filled with a desired product to which a component 20 is applied.

In the specific case described herein, the containers 10 are capsule type elements for the preparation of beverages for infusion, in particular coffee capsules. More specifically, the filling product placed inside the capsule is coffee powder.

Preferably, said capsule 10 may be made of multilayer material, for example materials that are composed of layers of PP (PolyPropylene) and/or EVOH (Ethylene Vinyl Alcohol) of PET (PolyEthylene Terephthalate) or PS (PolyStyrene). Alternatively, the capsule can be made of multilayer material with at least one metal alloy layer, e.g. aluminium-based.

In addition, the applied component 20 is a polymeric lid.

Preferably, said lid 20 may be made of multilayer material, for example materials that are composed of layers of PP (PolyPropylene) and/or EVOH (Ethylene Vinyl Alcohol) of PET (PolyEthylene Terephthalate) or PS (PolyStyrene).

Alternatively, the capsule can be made of multilayer material with at least one metal layer, e.g. aluminium-based.

Even more preferably, the lid 20 is a poly-coupled multilayer in which the layer in the centre comprises aluminium, the inner layer (coffee side) comprises a thermoplastic polymeric adhesive which is intended to melt and act as an adhesive when welding, the outer layer comprises a primer which is higher melting than the polymeric adhesive and is selected so as not to melt when the welder rests thereon and it is activated in the welding step, and also has the function of preserving the print made on the lid 20 (which is preferably made on the primer itself).

This polymeric lid comprises a coupling portion 25 which is effectively heat-sealable to the capsule 10.

Figures 2, 3:
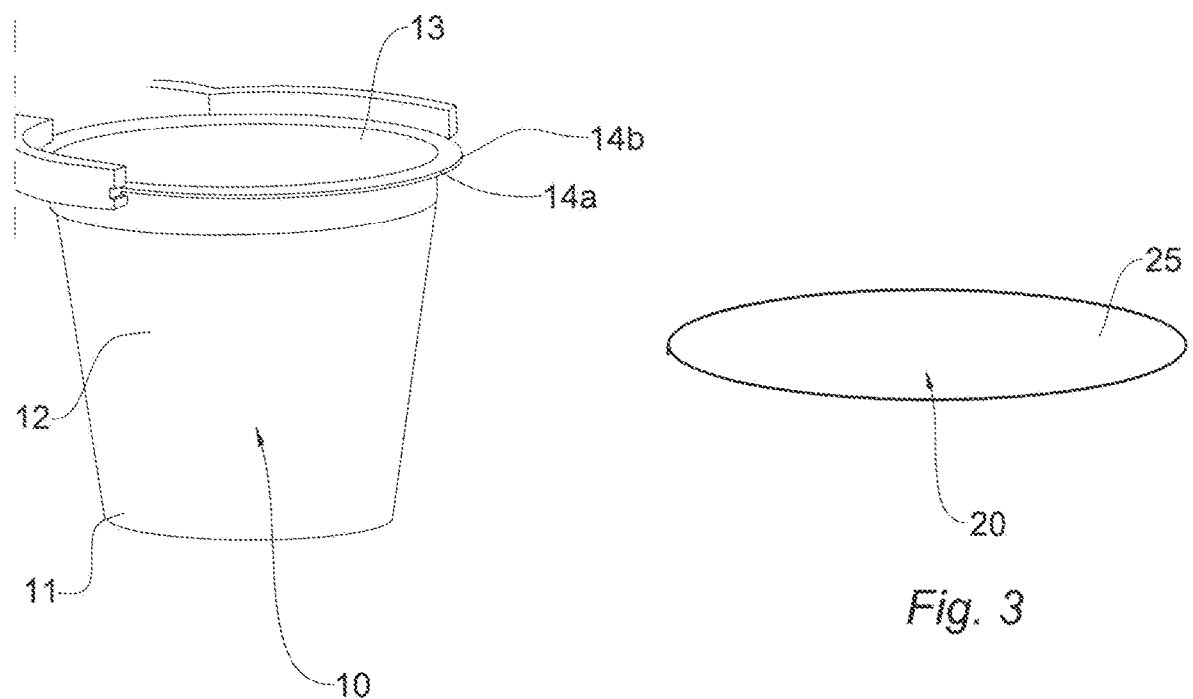
FIG. 2 represents a schematic perspective view of a container used by the retention and movement unit of the present invention.
FIG. 3 represents a schematic perspective view of a component used by the retention and movement unit of the present invention.

In the present example and as depicted in FIGS. 2, the capsule 10 has a substantially upturned truncated conical shape presenting a base 11 of substantially flat and circular shape from which a lateral wall 12 is transversely projected.

This lateral wall 12 is inclined with respect to the vertical line having the smaller diameter thereof at the base 11 and the larger diameter thereof at an upper opening 13.

Again with reference to FIG. 2, it can be noted that the lateral wall 12 of the container 10 ends at the top with an edge 14a projecting radially outward the container 10 itself.

An abutment surface 14B is identified on this edge 14A and which is configured to realise a coupling zone with the couplable portion 25 of the lid 20.

Preferably and with reference to FIG. 3, the lid 20 is circular in shape and can be superimposed to the upper opening 13 of the capsule 10 and the couplable portion 25 of the lid 20 is an annular portion that can be superimposed to the abutment surface 14b.

Figure 1A:
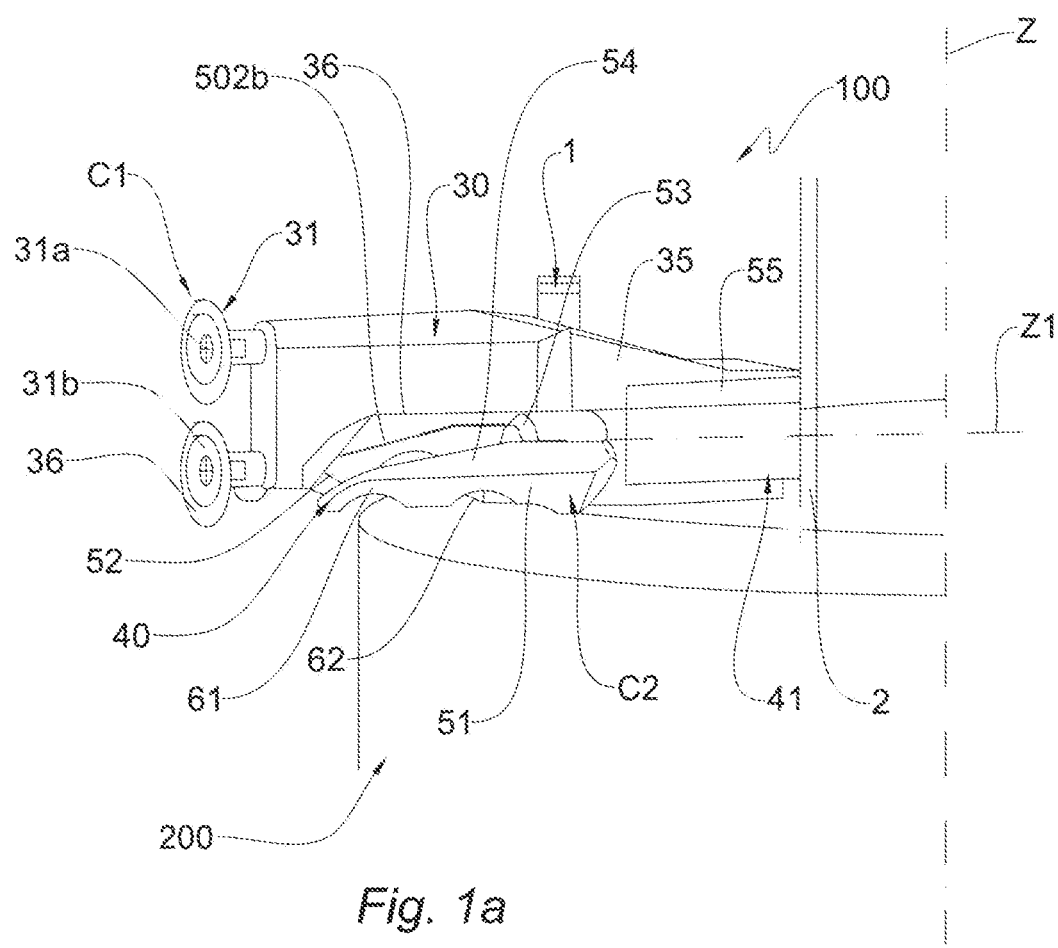
FIGS. 1a and 1b are each a schematic perspective view of a retention and movement unit constructed in accordance with the present invention.
Figure 1B:
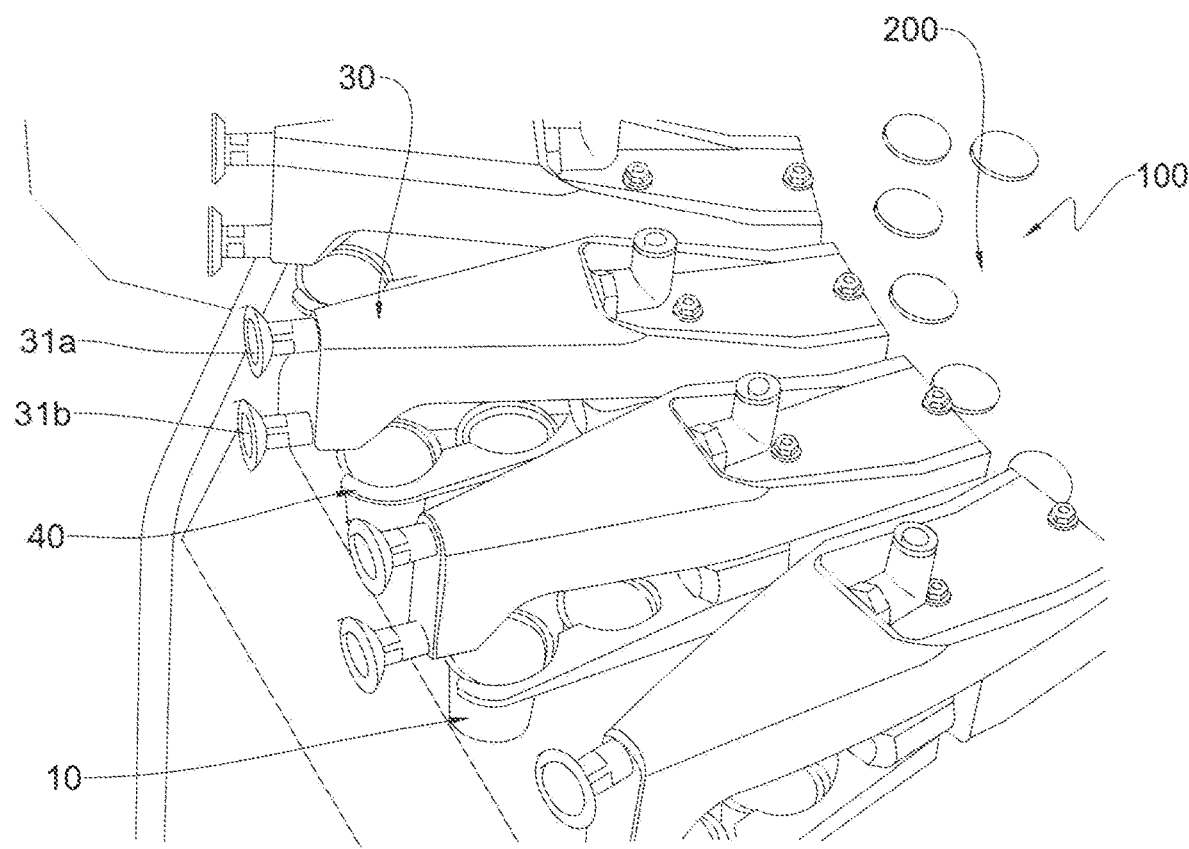

In FIGS. 1a and 1b with 100, there is defined a retention and movement unit of the capsule 10 and of the lid 20, comprising a moving retention member 1 in turn comprising a frame 2 and a first gripping device 30, which is secured to said frame 2, comprising a first retention element 31 configured so as to be able to take up a first configuration C1 which is suitable for selectively retaining the at least one component 20 by means of the first retention element 31.

Still with reference to FIG. 1a the moving retention member 1 comprises a second gripping device 40, which is also secured to the frame 2, which comprises a second retention element 41 which is configured so as to be able to take up a second configuration C2 which is suitable for selectively retaining the at least one container 10.

More specifically, as shown in FIG. 1a the first retaining element 31 is a suction cup 31a operating at reduced pressure. This suction cup 31a is fluid-dynamically connected to a reduced pressure system that operates at reduced pressure with respect to atmospheric pressure between −0.15 bar and −0.7 bar, more preferably around −0.3 bar.

The suction cup 31a is configured to be able to selectively retain the lid 20 during the desired process operations.

Again with reference to FIG. 1a, it can be noted that the first gripping device 30 comprises two first retaining elements 31, namely two suction cups 31a, 31b. In particular, said suction cups 31a, 31b are vertically oriented, i.e. their retaining surface 36 is substantially planar and has a vertical development. In addition, the two suction cups 31*a*, 31*b* are vertically aligned the one above the other.

It can also be noted that the two suction cups 31*a*, 31*b* are positioned with a predetermined spacing from each other.

Again with reference to FIG. 1*a*, it can be noted that the second retaining element 41 comprises a pair of movable claws 51, 52 of pincers each selectively rotatable about its individual second rotation axis Z1.

More specifically, each movable claw 51, 52 is rotated so as to move between a gripping configuration, in which it is at a minimum spacing from the other claw, and a release configuration, in which it is at a maximum spacing from the other claw. In this sense, therefore, each of the movable claws 51, 52 acts as a further abutment element 52*b* for the other claw.

It is advantageous to carry out this passage between the gripping configuration and the release configuration by rotating the movable claws 51, 52 in opposite directions to each other.

Each movable claw 51, 52 has substantially laminar extent and comprises a gripping edge 57, which faces a respective further gripping edge of the other movable claw 52, 51.

Each gripping edge 57 comprises at least one recess which is formed so as to define, in conjunction with said further gripping edge at least one seat 61.

Each movable claw 51, 52 is secured and substantially projecting horizontally from a respective base 53, 54 of cylindrical shape and vertical orientation.

These bases 53, 54 are secured by respective pins (not shown in the figures) to a central body 55 of said second gripping device 40.

The second rotation axis Z1 of the pins is oriented horizontally and thus allows each movable claw 51, 52 to rotate so as to move to and from said gripping configuration.

In this way, it is possible to be able to stably secure the capsule 10 to the moving retention member 1 when the movable claws 51, 52 are sufficiently close together and to be able to release the capsule 10 when the movable claws 51, 52 are sufficiently spaced apart.

In order to further efficiently produce such a configuration, the movable claws 51, 52 are each mounted on the respective bases 53, 54 not in the region of the second rotation axis Z1, instead with a predetermined spacing therefrom in such a manner that, when the movable claw is moved by means of rotation, this one carried out a curved movement other than zero. In other words, each movable claw is a rotating eccentric with respect to the respective second rotation axis Z1.

Each movable claw 51, 52 has a substantially laminar shape with one end opposite to the end connected to the respective base 53, 54 which end in a curved rounded shape.

Furthermore, each movable claw 51, 52 comprises two recesses in the shape of an arc of a semicircle which are formed in such a manner that, when the two movable claws 51, 52 are placed in the gripping configuration these two recesses form two seats 61, 62 that are suitable for stably receiving two capsules 10.

Such seats 61, 62 preferably have a substantially horizontal development when the two movable claws 51, 52 are in a gripping configuration.

Advantageously, the two housing seats 61, 62 thus realisable by means of the two movable claws 51,52 have a predetermined spacing between each other which is equivalent to the predetermined spacing between the two suction cups 31*a*, 31*b*. In other words, the centres of gravity of the two suction cups 31*a*, 31*b* have the same spacing as the centres of gravity of the two seats 61, 62.

With reference to FIGS. 1*a* and 1*b*, the first gripping device 30 is secured to the second gripping device 40 and they are vertically aligned with each other.

As shown in FIG. 1*a*, the first gripping device 30 comprises a first body 35 having a substantially parallelepipedal development in which a vertical recess 36 is realised which is formed so as to provide free space of movement of the two movable claws 51, 52 when they move away from each other.

The retention and movement unit 100 comprises a plurality of moving retention members 1 which are mounted according to a radial orientation of the carousel 200.

Such a retention and movement unit 100 comprises a plurality of moving retention members 1, preferably a multiple of two. Even more preferably a number of retention members equal to 32.

Three zones are defined on this rotary carousel 200: a transfer zone Zt, a reception zone Zr and a release zone Zri.

FIG. 4 shows possible positions with respect to the rotary carousel 200 of the aforesaid three zones of interest.

More specifically, the transfer zone Zt and the reception zone Zr are portions of space in which the retention and movement unit 100 releases two lids 20 and simultaneously takes two capsules 10 from the same second operatively interacting unit 100'.

The release zone Zri is a zone which is located downstream, by way of example this zone is located at about 120° downstream of said reception zone.

According to one embodiment, the rotary carousel 200 is divided into three sectors of about 120° each. In one, the lids 20 are transported without the caps 10, in another one, the finished caps 10 are transported with the associated lid 20 and in the third sector, the first and second gripping devices 30, 40 return to the initial positions.

In the release zone Zri, the capsule 10 is transferred by the retention and movement unit 100 to a third operatively interacting unit 100".

The capsules 10 that are transferred from the retention and movement unit 100 to the third unit 100" are the same capsules 10 that have been previously transferred to and processed by the second unit 100'.

The third unit 100" is preferably a conveyor belt or a rotary carousel.

Again with reference to FIG. 1*a*, it can be noted that the first and second gripping devices 30, 40 are arranged along a line which projects outward the near profile of the rotary carousel 200.

In this way it is easier to carry out the various interacting operations with the second and third units 100', 100".

Thus, with reference to FIGS. 1 to 4, the method for transferring the cap 20 to the second unit 100' while receiving the capsule 10 also from the second unit 100' comprises
  a. Providing the retention and movement unit 100 with the characteristics described above,
  b. Rotating the first gripping device 30 moving it to a functionally arranged lid feeder 20,
  c. Activate said first gripping device 30 and removing two lids 20 through it from a lid feeder 20,
  d. Rotating the retention and movement unit 100 so as to move said first gripping device 30 to the transfer zone Zt while keeping it activated,
  e. Deactivating said first gripping device 30 and transferring the two lids 20 to a second unit 100' by means of the first gripping device 30 according to the first configuration C1, f. Moving said retention and movement unit 100 so as to move the second gripping device 40 to said reception zone Zr, g. Activating the second gripping device 40 and receiving therein two capsules 10 by means of the second configuration C2, h. Moving the retention and movement unit 100 while keeping the second gripping device 40 active so as to move it to the release zone Zri, i. Deactivating the second gripping device 40 by transferring the two capsules 10 to the third unit 100", l. Rotating the retention and movement unit 100 by bringing the first gripping device 30 back to the component feeder 20, m. Starting over from point c.

In this sense, in the present embodiments described by way of example in detail, the first configuration C1 of the two suction cups 31*a*, 31*b* corresponds to their steric position which is configured so as to allow them to effectively reach and interact with both the lid feeder and the second unit 100' without having to move further and selectively activating and deactivating the two suction cups as required. This ideally reduces the necessary relative movements of the suction cups.

The second configuration C2 of the movable claws 51, 52 corresponds to their steric position and to their possibility to rotate as eccentrics with respect to the respective bases 53, 54.

During the operations of step a. the retention and movement unit 100 has the two suction cups 31*a*, 31*b* in deactivated mode and thus disconnected from a lid 20.

During the operations of step b. the retention and movement unit 100 rotates by means of the rotary carousel 200 until the two suction cups 31*a*, 31*b* are brought into a position of interaction with the lid feeder 20. This feeder conveys the lids arranged according to the removal modes of the two suction cups 31*a*, 31*b* by means of suitable selectively activatable retention devices. In the example under consideration, according to vertical orientation.

In these steps the pincer 41 is not active, i.e. it is not securing any object.

Upon reaching the transfer zone Zt following the rotation of the rotary carousel 200, the two suction cups 31*a*, 31*b* are deactivated, thus creating the condition that allows the two lids 20 to be transferred to the second unit 100'.

Simultaneously, the second unit 100' transports by means of moving members a plurality of capsules 10 which are positioned according to a spatial pattern that can be superimposed on the two seats 61, 62 defined by the two mobile claws 51,52 of the second gripping device 40.

At this point, the two movable claws 51, 52 rotate around their respective rotation axes Z1, pass to the gripping configuration and engage on the two capsules 10. The second unit 100' deactivates the retention elements acting on the two capsules 10 so as to transfer them to the retention and movement unit 100 at the reception zone Zr.

At this point, the retention and movement unit 100 keeps the movable claws 51, 52 active while it continues to rotate moving towards the release zone of the two capsules 10.

Upon reaching the release zone Zri the two movable claws 51, 52 move into the release configuration and transfer the two capsules 10 to retention elements of the third which operatively interacting unit 100".

Thanks to this technical solution, the Applicant has found that it is possible to process at least 1,500 capsules per minute.

The invention claimed is:

1. A retention and movement unit of at least one component and at least one container, comprising a moving retention member and a rotary carousel, the moving retention member comprising:
   (a) a frame,
   (b) a first gripping device secured to said frame, comprising a first retention element, the first gripping device having a first configuration for selectively retaining said at least one component by said first retention element, and
   (c) a second gripping device secured to said frame, comprising a second retention element, the second gripping device having a second configuration, different from said first configuration, for selectively retaining said at least one container:
   wherein said first retention element operates at reduced pressure to retain the at least one component and said second retention element is a selectively actuatable pincer to move the at least one container;
   wherein the first retention element and the second retention element of the moving retention member retain the at least one component and move the at least one container simultaneously, and
   wherein the rotary carousel, in which said moving retention member is received, is for moving said retention and movement unit along a closed loop processing trajectory.

2. The retention and movement unit according to claim 1, wherein at least one of said first retention element and said second retention element operates at reduced pressure.

3. The retention and movement unit according to claim 1, wherein the selectively actuatable pincer comprises at least one movable claw configurable for being reversibly moved between a gripping configuration, in which each said at least one movable claw is at a minimum spacing from a further abutment element, and a release configuration, in which each said at least one movable claw is at a maximum spacing from said further abutment element.

4. The retention and movement unit according to claim 3, wherein said at least one movable claw is moved by rotation about a second horizontal rotation axis.

5. The retention and movement unit according to claim 3, wherein said at least one movable claw has a substantially laminar extent and comprises:
   a gripping edge facing said further abutment element, and
   at least one recess configured to define, in conjunction with said further abutment element, at least one seat for said container.

6. The retention and movement unit according to claim 4, wherein said pincer comprises a pair of movable claws cooperating with each other so that each acts as said further abutment element for the other, each movable claw being rotatable about an individual second horizontal rotation axis.

7. The retention and movement unit according to claim 6, wherein said movable claws of said pair of movable claws are each mounted on respective bases, not in a region of said second rotation axis, but instead with a predetermined spacing from said second rotation axis in such a manner that each movable claw is configured to perform a rotational movement along a curved trajectory.

8. The retention and movement unit according to claim 1, wherein said second retention element is vertically aligned with said first retention element.

9. The retention and movement unit according to claim 1, further comprising a plurality of moving retention members, the moving retention member being one of the plurality of moving retention members, wherein the plurality of moving retention members spaced apart with uniform angular spacing are received in said rotary carousel.

10. The retention and movement unit according to claim 9, wherein each moving retention member of said plurality of moving retention members comprises a plurality of seats arranged radially in alignment with said rotary carousel.

11. The retention and movement unit according to claim 1, wherein said first retention element and second retention element move with a continuous movement.

12. An article production apparatus comprising:
the retention and movement unit according to claim 1, and
a second unit operatively interacting with said retention and movement unit, configured to receive from said retention and movement unit, at a predetermined transfer zone of said retention and movement unit, at least one component and to transfer, at a predetermined reception zone (Zr) of said retention and movement unit, at least one container to said retention and movement unit.

13. The apparatus according to claim 12, wherein said transfer zone and said reception zone substantially coincide with each other.

14. The apparatus according to claim 12, further comprising:
a third unit operatively connected to an outlet transfer line comprised in said retention and movement unit, said third unit being connected downstream of said reception zone (Zr) in accordance with said direction of movement of said retention and movement unit.

15. The apparatus according to claim 14, wherein said third unit comprises a belt or a rotary carousel.

16. A method for retaining and moving at least one component and at least one container, comprising:
(i) providing a retention and movement unit comprising a moving retention member and a rotary carousel in which a transfer zone, a reception zone, and a release zone are defined along a closed loop processing trajectory, the moving retention member comprising:
(a) a first gripping device, comprising a first retention element, the first gripping device having a first configuration for said at least one component, and
(b) a second gripping device, comprising a second retention element, the second gripping device having a second configuration, different from said first configuration, for selectively retaining said at least one container,
(ii) picking up said at least one component by said first gripping device,
(iii) moving said retention and movement unit by said rotary carousel to move said first gripping device in a region of said transfer zone,
(iv) transferring to a second unit, operatively interacting, with said retention and movement unit, said at least one component by said first gripping device in said first configuration,
(v) moving said retention and movement unit by said rotary carousel to move said second gripping device at said reception zone, and receiving said at least one container in said second gripping device in said second configuration,
(vi) moving said retention and movement unit by said rotary carousel to move said second gripping device at said release zone, and
(vii) releasing by said second gripping device said at least one container at a third unit operatively interacting with said retention and movement unit at said release zone,
wherein said first retention element operates at reduced pressure to retain the at least one component and said second retention element is a selectively actuatable pincer to move the at least one container, and
wherein the first retention element and the second retention element of the moving retention member retain the at least one component and move the at least one container simultaneously.

17. The method according to claim 16, wherein said moving comprises transporting said retention and movement unit along the closed loop processing trajectory where said transfer zone, said reception zone and said release zone are defined.

18. The method according to claim 17, wherein said moving is performed by rotation of said rotary carousel about a rotation axis.

19. The method according to claim 16, wherein said transfer to said third unit is carried out by an outlet transfer line positioned downstream with respect to said transfer zone in accordance with a direction of movement of said rotary carousel.

* * * * *